(12) United States Patent
Kamimura et al.

(10) Patent No.: US 6,643,785 B1
(45) Date of Patent: Nov. 4, 2003

(54) INTERRUPTION CONTROL CIRCUIT FOR USE IN AN APPARATUS HAVING A MICROCOMPUTER

(75) Inventors: Toshiyuki Kamimura, Yokohama (JP); Koichi Teraya, Yokosuka (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 574 days.

(21) Appl. No.: 09/666,459

(22) Filed: Sep. 21, 2000

(30) Foreign Application Priority Data

Sep. 27, 1999 (JP) .......................................... 11-273218

(51) Int. Cl.[7] .............................................. G06F 1/32
(52) U.S. Cl. ...................................................... 713/323
(58) Field of Search ................................. 713/300, 320, 713/323

(56) References Cited

U.S. PATENT DOCUMENTS 5,237,692 A * 8/1993 Raasch et al. ............... 710/267
5,283,906 A * 2/1994 Chen ........................... 713/323
5,355,503 A * 10/1994 Soffel et al. ................. 713/322
5,939,998 A    8/1999 Caporuscio et al.

FOREIGN PATENT DOCUMENTS

JP          11-093990          3/1999

* cited by examiner

*Primary Examiner*—Thomas M. Heckler
(74) *Attorney, Agent, or Firm*—Oblon, Spivak, McClelland, Maier & Neustadt, P.C.

(57) ABSTRACT

A CPU deactivates an A/D converter section before it stops operating in an idle mode. When any one of the keys in key matrices is pushed, the key matrix including the key pushed generates a voltage. The voltage is applied to the A/D converter section and one of buffer circuits. If the voltage is lower than the threshold voltage of the buffer circuit, the output signal of an AND circuit changes, and an interrupt-signal generating circuit generates a signal for releasing the idle mode. In response to this signal, the CPU starts operating and activates the A/D converter section.

18 Claims, 5 Drawing Sheets

INTERRUPTION CONTROL CIRCUIT FOR USE IN AN APPARATUS HAVING A MICROCOMPUTER

CROSS-REFERENCE TO RELATED APPLICATIONS

This application is based upon and claims the benefit of priority from the prior Japanese Patent Application No. 11-273218, filed Sep. 27, 1999, the entire contents of which are incorporated herein by reference.

BACKGROUND OF THE INVENTION

The present invention relates to an electronic apparatus incorporating a microcomputer, such as a television receiver. More particularly, the invention relates to an interruption control circuit for restoring such an electronic apparatus from an idling state to a normal operating state.

Television receivers developed in recent years have many functions such as channel-displaying function and multi-screen displaying function. Further, they are designed to display satellite-broadcast programs and audio-multiplexed programs. To perform various functions and display programs of different types, a television receiver incorporates a microcomputer.

Figure 6:
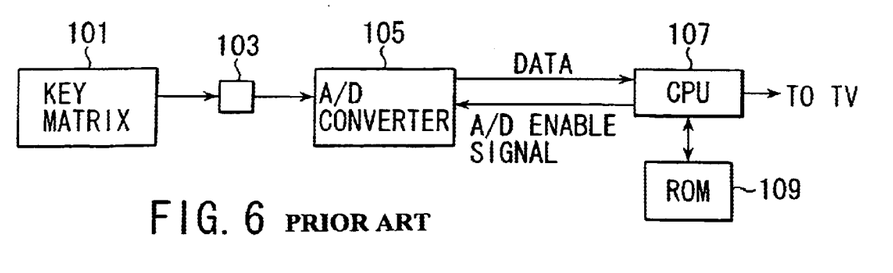
FIG. 6 is a diagram depicting the microcomputer section of a television receiver, for explaining the prior art and the disadvantageous aspects thereof.

FIG. 6 shows a conventional microcomputer section incorporated in a television receiver. As shown in FIG. 6, the microcomputer section comprises a key matrix 101, an A/D converter 105, an input terminal 103, a CPU (Central Processing Unit) 107, and a ROM 109. The input terminal 103 connects the key matrix 101 and the A/D converter 105.

Figure 7:
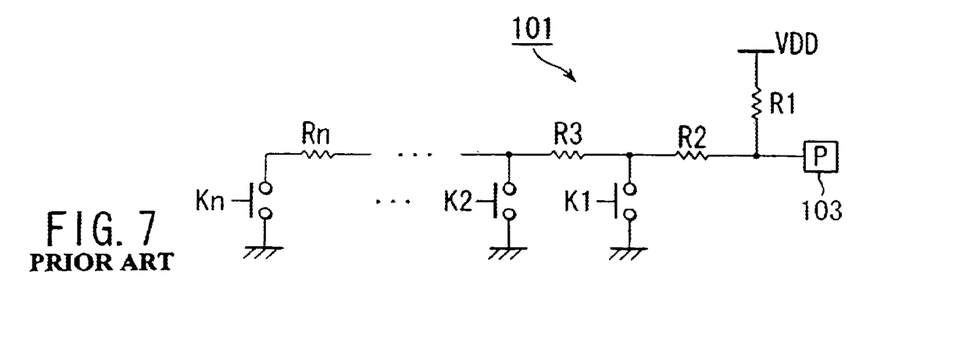
FIG. 7 is a circuit diagram of the key matrix incorporated in the microcomputer section shown in FIG. 6.

FIG. 7 shows the key matrix 101 in greater detail. The key matrix 101 has switches K1, K2, . . . , Kn and resistors R1, R2, . . . , Rn. The switches K1 to Kn and resistors R1 to Rk are associated with n keys (not shown), respectively. As the switches K1 to Kn are turned on and off, in various combinations, the key matrix 101 generates different voltages.

Assume that one of the keys of the key matrix 101 is pushed. Then, the voltage assigned to the key pushed is applied from the key matrix 101 via the input terminal 103 to the A/D converter 105. The CPU 107 drives the A/D converter 105 in accordance with the program stored in the ROM 109. Thus driven, the A/D converter 105 converts the input voltage to digital data. The digital data is input to the CPU 107. From the digital data the CPU 107 determines which key of the key matrix 101 has been pushed. The CPU 107 controls major components of the television receiver.

The microcomputer section shown in FIG. 6 can accurately determine which key or keys of the key matrix 101 is pushed, no matter when it is pushed.

If the key matrix 101 remains not operated for a prescribed period of time, the television receiver is set into the idle mode. The microcomputer section always stays in the normal mode, however, no matter whether the television receiver is set in the idle mode or the normal mode. Thus, the CPU 107 keeps operating, thus causing the A/D converter 105 functioning. It is therefore determined, at regular intervals, whether the key matrix 101 has been operated or not. Since the CPU 107 keeps operating even if the television receiver stays in the idle mode, the microcomputer section consumes power at all times.

To reduce the power consumption in the microcomputer section, it has been proposed that the CPU 107 be stopped while the television receiver stays in the idle mode, thereby to turn off the A/D converter 105. To set the CPU 107 into the normal mode from the idle mode, an interrupt signal must be supplied to the CPU 107.

To generate an interrupt signal and supply it to the CPU 107, the key matrix 101 must have an additional key. Moreover, the port for supplying the interrupt signal cannot serve for any other purpose.

BRIEF SUMMARY OF THE INVENTION

The present invention has been made in view of the foregoing. The object of the invention is to provide an interruption control circuit for use in an electronic apparatus incorporating a CPU. The interruption control circuit is designed to set the CPU into operation, with ease, whenever necessary, to reduce the power the apparatus consumes while the CPU remains in an idling state.

To achieve the object, the present invention provides an interruption control circuit comprising: a group of key matrices, each having keys and designed to generate different voltages when the keys are operated; an analog-to-digital converter section for converting the voltages applied from the key matrices to digital data; a control section designed to activate the analog-to-digital converter section in an normal mode, deactivate the same in an idle mode, stop operating in the idle mode, and determine, in the normal mode, which key of any key matrix has been pushed, from the digital data supplied from the analog-to-digital converter section; a plurality of buffer circuits for receiving the voltages applied from the key matrices, respectively, each buffer circuit having a threshold voltage and designed to output a first-level signal when the voltage is equal to or higher than the threshold voltage and to output a second-level signal when the voltage is lower than the threshold voltage; a logic circuit for receiving signals output from the buffer circuits and generating a detection signal when the signal output from any one of the buffer circuits changes; and an interrupt-signal generating circuit connected to the logic circuit, for generating a signal for releasing the idle mode and supplying the same to the control circuit when the logic circuit generates the detection signal.

To attain the above-mentioned object, this invention provides an interruption control circuit comprising: a group of key matrices, each having keys and designed to generate different voltages when the keys are operated; an analog-to-digital converter section for converting the voltages applied from the key matrices to digital data; a control section designed to activate the analog-to-digital converter section in an normal mode, deactivate the same in an idle mode, stop operating in the idle mode, and determine, in the normal mode, which key of any key matrix has been pushed, from the digital data supplied from the analog-to-digital converter section; a plurality of buffer circuits for receiving the voltages applied from the key matrices, respectively, each buffer circuit having a threshold voltage and designed to output a first-level signal when the voltage is equal to or higher than the threshold voltage and to output a second-level signal when the voltage is lower than the threshold voltage; a logic circuit for receiving signals output from the buffer circuits and generating a detection signal when the signal output from any one of the buffer circuits changes; an interrupt-signal generating circuit connected to the logic circuit, for generating a signal for releasing the idle mode and supplying the same to the control section when the logic circuit generates the detection signal; and a signal-supplying circuit for supplying the output signals of the buffer circuits to the control section. In this interruption control circuit, the control section selects any key matrix in which at least one key has been pushed, in accordance with the output signals of the buffer circuits, and supplies a selection signal to the analog-to-digital converter section, and the analog-to-digital converter section converts the output voltage of the key matrix to digital data.

To achieve the object described above, the present invention provides an interruption control circuit comprising: a group of key matrices, each having keys and designed to generate different voltages when the keys are operated; an analog-to-digital converter section for converting the voltages applied from the key matrices to digital data; a control section designed to deactivate the same in an idle mode, stop operating in the idle mode, and determine, in a normal mode, which key of any key matrix has been pushed, from the digital data supplied from the analog-to-digital converter section; a plurality of buffer circuits for receiving the voltages applied from the key matrices, respectively, each buffer circuit having a threshold voltage and designed to output a first-level signal when the voltage is equal to or higher than the threshold voltage and to output a second-level signal when the voltage is lower than the threshold voltage; selection circuits connected to output terminals of the buffer circuits, respectively, each for selecting the output signal of the associated buffer circuit in the idle mode; a logic circuit for receiving signals output from the selection circuits and generating a detection signal when the signal output from any one of the buffer circuits changes; an interrupt-signal generating circuit connected to the logic circuit, for generating a signal for releasing the idle mode and supplying the same to the control section when the logic circuit generates the detection signal; and an activating circuit for activating the analog-to-digital converter section in accordance with the detection signal generated by the logic circuit.

In order to achieve the above-mentioned object, the present invention provides an interruption control circuit comprising: a group of key matrices, each having keys and designed to generate different voltages when the keys are operated; an analog-to-digital converter section for converting the voltages applied from the key matrices to digital data; a control section designed to deactivate the same in an idle mode, stop operating in the idle mode, and determine, in a normal mode, which key of any key matrix has been pushed, from the digital data supplied from the analog-to-digital converter section; a plurality of buffer circuits for receiving the voltages applied from the key matrices, respectively, each buffer circuit having a threshold voltage and designed to output a first-level signal when the voltage is equal to or higher than the threshold voltage and to output a second-level signal when the voltage is lower than the threshold voltage; a logic circuit for receiving signals output from the buffer circuits and generating a detection signal when the signal output from any one of the buffer circuits changes; an interrupt-signal generating circuit connected to the logic circuit, for generating a signal for releasing the idle mode and supplying the same to the control section when the logic circuit generates the detection signal; and a channel-selecting circuit for receiving the output signals of the buffer circuits, selecting any key matrix in which at least one key has been pushed, and outputting a selection signal. In this interruption control circuit, the analog-to-digital converter section converts, to digital data, the voltage applied from the key matrices in accordance with the selection signal.

With the present invention it suffices for the user to operate the keys provided in the key matrices, in order to activate the control section. Hence, the key matrices need not have any additional keys for generating interrupt signals. Until any one of the keys provided in the key matrices is pushed, the control section can remain in the idle mode. This helps to reduce the power consumption of the control section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described, with reference to the accompanying drawings.

First Embodiment

Figure 1:
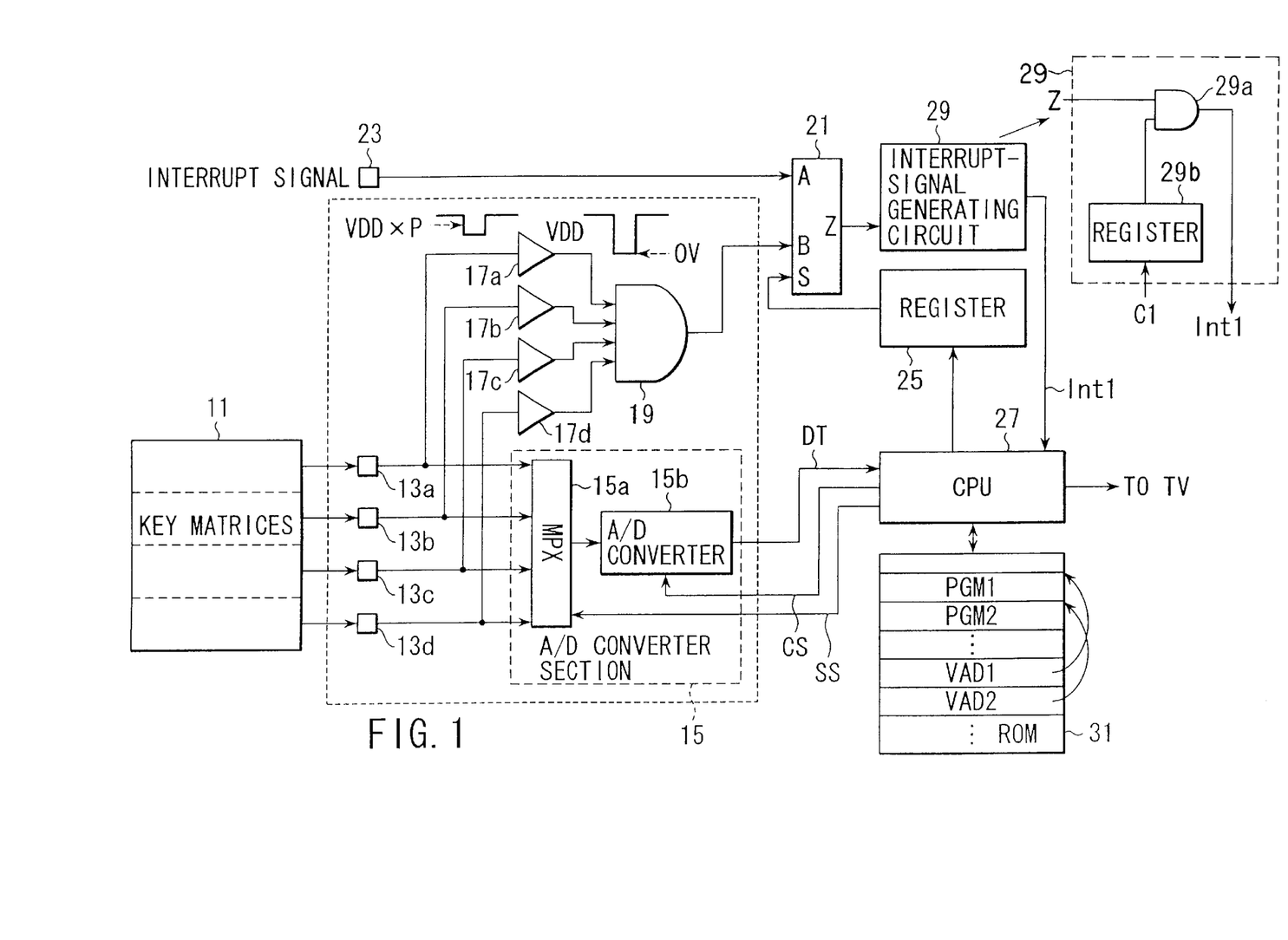
FIG. 1 is a diagram showing the microcomputer section of a television receiver, which incorporates the first embodiment of the present invention.

FIG. 1 shows the microcomputer section of a television receiver, which incorporates the first embodiment of the present invention.

Four key matrices 11 are provided on, for example, the housing of the television receiver. Each key matrix 11 has the structure shown in FIG. 6. Each key matrix 11 comprises switches, to which the various functions of the television receiver are assigned. More precisely, the switches of each key matrix 11 operate as a power switch, station-selecting switches, a volume switch and the like.

The output voltages of the four key matrices 11 are applied through input terminals 13a, 13b, 13c and 13d to an A/D converter section 15. The voltages are applied to buffer circuits 17a, 17b, 17c and 17d, respectively, too. The A/D converter section 15 comprises a multiplexer 15a and an A/D converter 15b. The voltages output from the four key matrices 11 to the input terminals of the multiplexer 15a. The multiplexer 15a selects one of the analog voltages, in accordance with a selection signal SS supplied from a CPU 27. The output voltage of the multiplexer 15a is applied to the A/D converter 15b. The A/D converter 15b converts the input voltage to digital data DT, under the control of a control signal CS supplied from the CPU 27. The digital data DT is supplied to the CPU 27.

The buffer circuits 17a to 17d determines whether the voltages applied from the key matrices 11 are effective or ineffective. A threshold voltage (VDD×p, where VDD is the power-supply voltage and p is a coefficient, e.g., 0.6) is set in the buffer circuits 17a to 17d. If the input voltage exceeds the threshold voltage (VDD×p), each buffer circuit outputs a high-level signal which indicates that the voltage input from the associated key matrix 11 is ineffective. If the voltage is lower than the threshold voltage, each buffer circuit outputs a low-level signal indicating which indicates that the voltage input from the associated key matrix 11 is effective. The signals output from the buffer circuits 17a to 17d are supplied to an AND circuit 19. The output of the AND circuit 19 is supplied to an input terminal B of a selector 21.

The selector 21 has another input terminal A. The input terminal A is connected to an input terminal 23. The input terminal 23 receives an interrupt signal from an external device or an internal device. The interrupt signal has been generated by the user. The selector 21 has a control terminal S, which is connected to the output terminal of a register 25. The register 25 holds the signal supplied from the CPU 27. The signal held in the register 25 controls the selector 21. More specifically, the selector 21 selects the input terminal A or the input terminal B in accordance with the control signal supplied from the register 25. The signal supplied to the input terminal A or B thus selected is output from the output terminal Z of the selector 21. The output terminal Z of the selector 21 is connected to the input terminal of an interrupt-signal generating circuit 29.

The interrupt-signal generating circuit 29 generates an interrupt signal upon receipt of the signal supplied from the output terminal Z of the selector 21. The interrupt-signal generating circuit 29 has, for example, a two-input AND circuit 29a and a register 29b. The first input terminal of the AND circuit 29a receives the output signal of the selector 21. The second input terminal of the AND circuit 29a receives the output signal of the register 29b. The register 29b receives the control signal C1 supplied from the CPU 27. The control signal C1 is set at "1" while the microcomputer section remains in the idle mode. While the microcomputer section remains in the normal mode, the control signal C1 is set at "1" or "0" in accordance with the user specification. The AND circuit 29a generates an interrupt signal Intl when both signal supplied to it have logic value "1". The interrupt signal is supplied to the CPU 27. The interrupt signal Intl is set at "1" while the microcomputer section remains in the idle mode. When an interrupt signal is supplied to the interrupt-signal generating circuit 29 via the selector 21, the interrupt signal Intl is set at "0".

A ROM 31 is connected to the CPU 27. The ROM 31 stores programs PGM1, PGM2, . . . for operating the CPU 27 and vector addresses VAD1, VAD2, . . . representing the head addresses of the programs PGM1, PGM2, . . . The CPU 27 reads the programs stored in the ROM 31 and execute them, thereby controlling the peripheral circuits such as the A/D converter section 15.

Figure 2A:
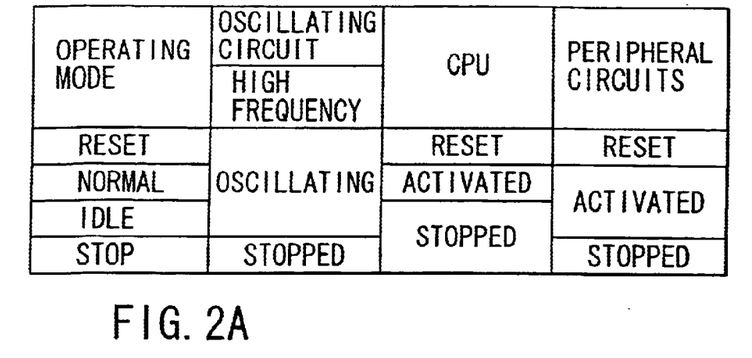
FIG. 2A is a table showing the operating modes of the first embodiment and the functions the components of the first embodiment perform.
Figure 2B:
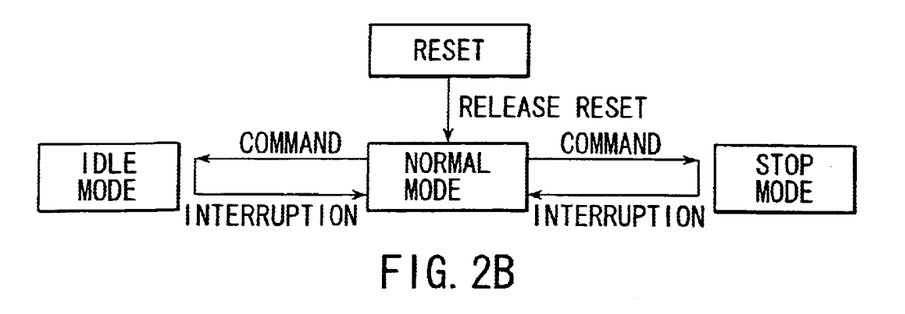
FIG. 2B is a diagram illustrating how the first embodiment operates.

How the microcomputer section operates will be described, with reference to FIGS. 2A and 2B. FIG. 2A is a table showing the various operating modes of the microcomputer section. FIG. 2B is a diagram illustrating the operation of the microcomputer section.

To supply an interrupt signal, generated either externally or internally, to the selector 21, the CPU 27 supplies a signal "0" to the register 25. The register 25 supplies a control signal "0" to the selector 21. The selector 21 selects the input terminal A in response to the control signal "0".

If the key matrices 11 have not been operated for a predetermined time, the CPU 27 changes the operating mode of the microcomputer section, from the normal mode to the idle mode. Immediately before changing the operating mode of the microcomputer section, the CPU 27 supplies a signal "1" to the registers 25 and 29c. After changing the operating mode, the CPU 27 stops operating. The register 25 supplies the signal "1" to the selector 21. The selector 21 selects the terminal B in response to the signal "1". At this time, the CPU 27 turns off the A/D converting section 15.

If the keys of the key matrices 11 remain not pushed in this condition, the key matrices 11 generate voltages equal to or higher than the threshold voltage (VDD×p) of the buffer circuits 17a to 17d. That is, a voltage equal to or higher than the threshold voltage (VDD×p) output from the terminal 103 (FIG. 6) of each key matrix 11 since all switches (FIG. 6) of the key matrix 11 are off. The voltages generated by the key matrices 11 are applied via the input terminals 13a to 13d to the A/D converter section 15. They are applied also to the buffer circuits 17a to 17d through the input terminals 13a to 13d. The signals output from the buffer circuits 17a to 17d are therefore all "1". The signals of logic value "1" are supplied to the AND circuit 19. The AND circuit 19 therefore outputs a signal of logic value "1". This signal is supplied via the selector 21 to the interrupt-signal generating circuit 29. The circuit 29 outputs an interrupt signal Intl, which has logic value "1". The interrupt signal Intl is supplied to the CPU 27. The CPU 27 remains stopped since the interrupt signal Intl has logic value "1".

If any key of the key matrices 11 is pushed, the key matrix 11 having the key pushed generates a voltage. The voltage is applied via one of the input terminals 13a to 13d to the A/D converter section 15 and one of the buffer circuits 17a to 17d. If the voltage is lower than the threshold voltage (VDD×p) of the buffer circuits 17a to 17d, the buffer circuits that receives this voltage generates a signal of logic level "0". In this case, the AND circuit 19 outputs a signal of logic value "0". This signal is supplied via the selector 21 to the interrupt-signal generating circuit 29. The circuit 29 outputs an interrupt signal Intl, which has logic value "0". The interrupt signal Intl is supplied to the CPU 27. The CPU 27 is thereby activated, changing the operating mode of the microcomputer section, from the idle mode to the normal mode.

When the operating mode of the microcomputer section is changed from the idle mode to the normal mode, the CPU 27 reads a desired vector address stored in the ROM 31 and executes the program this vector address designates. That is, the CPU 27 supplies a control signal SC to the A/D converter 15b in accordance with the program, thereby turning on the A/D converter 15b. Further, the CPU 27 supplies a selection signal SS to the multiplexer 15a. The input terminals of the multiplexer 15a is sequentially switched by the selection signal SS. The voltages applied from the key matrices 11 are therefore sequentially applied from the multiplexer 15a to the A/D converter 15b. The A/D converter 15b converts the voltages to digital data. The CPU 27 receives the digital data DT from the A/D converter section 15. From the digital data the CPU 27 determines from the digital data DT which key of the key matrices 11 has been pushed, by executing the program stored in and read from the ROM 31. Further, the CPU 27 controls the television receiver in accordance with which key has been pushed.

If the any key of key matrices 11 has remained not operated for the predetermined time, the CPU 27 turns off the A/D converter section 15 in the same way as described above. The CPU 27 then changes the operating mode of the microcomputer section, from the normal mode to the idle mode.

In the first embodiment, the CPU 27 can be activated by any one of the keys of the key matrices 11 is operated while the microcomputer section remains in idle mode. Therefore, the key matrices 11 do not require an additional key for inputting an interrupt signal as in the conventional microcomputer section shown in FIG. 6.

Moreover, the CPU 27 keeps the A/D converter section 15 off and the register 25 holds the signal output from the CPU 27, as long as the microcomputer section remains in the idle mode. This signal held in the register 25 controls the selector 21. Thus controlled, the selector 21 selects the signal output from the AND circuit 19, whereby stopping the CPU 27. This helps to reduce the power consumption in the microcomputer section.

Furthermore, the voltages generated by the key matrices 11 are applied to the interrupt-signal generating circuit 29 through the buffer circuits 17a to 17d, AND circuit 19 and selector 21, thereby generating a signal for releasing the idle mode. Thus, key inputs for several channels of the key matrices 11 are processed.

Note that the threshold voltages of the buffer circuits 17a to 17d can be adjusted, thereby to eliminate the influence of noise. This measure taken, a signal for releasing the idle mode can be generated without fail.

Second Embodiment

Figure 3:
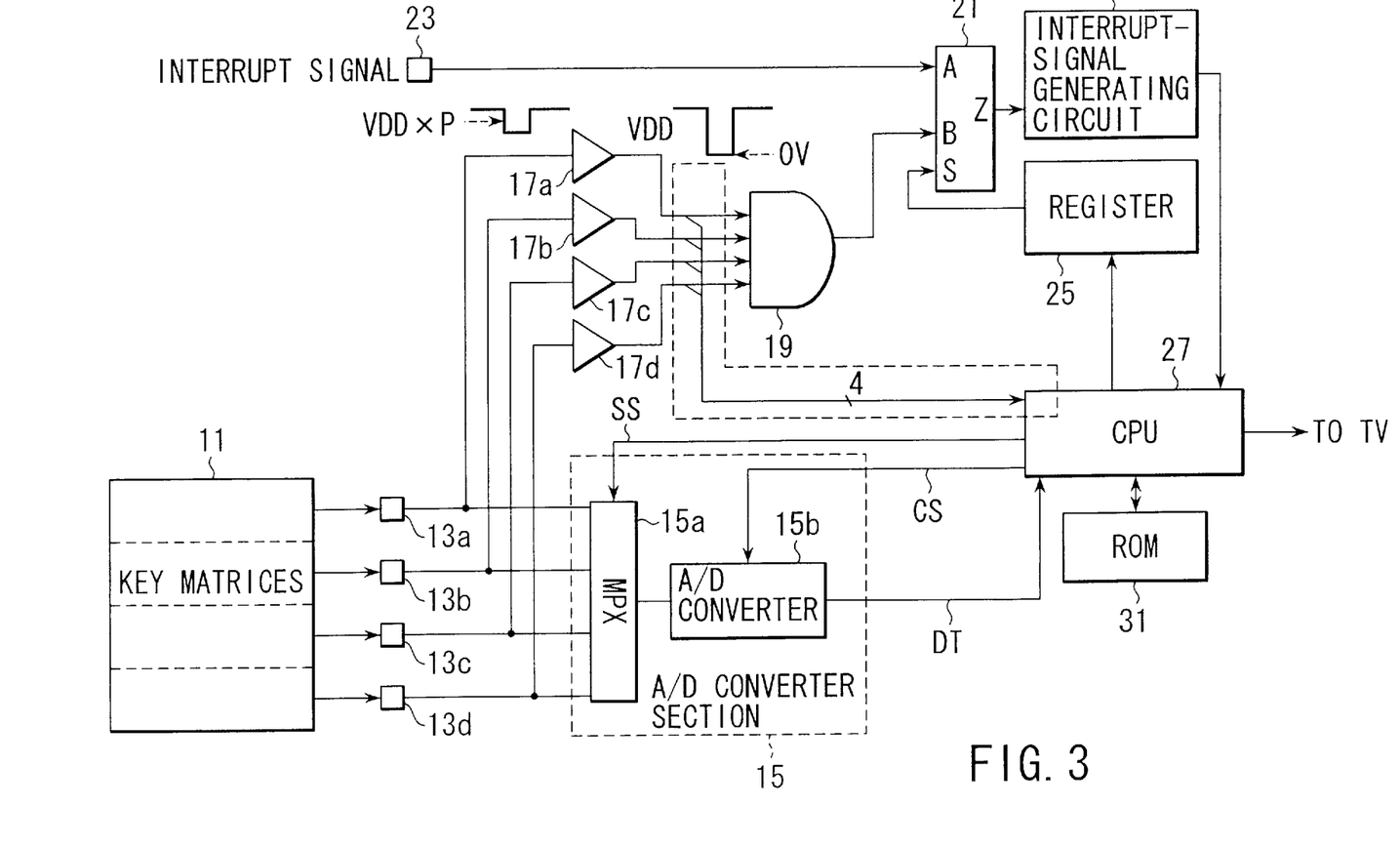
FIG. 3 is a diagram showing the microcomputer section of a television receiver, which incorporates the second embodiment of the invention.

FIG. 3 shows the microcomputer section of a television receiver, which incorporates the second embodiment of this invention. The components identical to those shown in FIG. 1 are designated at the same reference numerals and will not described in detail. The second embodiment is characterized in that the CPU 27 monitors the outputs of the buffer circuits 17a to 17d.

As shown in FIG. 3, four key matrices 11 are provided to generate signals. In the first embodiment, the CPU 27 sequentially switches the input terminals of the multiplexer 15a, thereby applying to the A/D converter 15a the voltages generated by the key matrices 11, after the operating mode of the microcomputer section is switched from the idle mode to the normal mode. However, which key of which key matrix 11 has been operated cannot be determined. If any key operated is one that the multiplexer 15aselects after many other keys, it will take much time for the A/D converter 15b to output digital data corresponding to the key operated.

Thus, in the second embodiment, the CPU 27 receives the outputs of all buffer circuit 17a to 17d, as monitored signals, so that the CPU 27 may determine which key of the key matrices 11 has been pushed. In addition, the voltage generated when this key is pushed is applied to the A/D converter 15b prior to the voltages-generated later in the key matrices 11. Thus, the voltage can be converted to digital data more efficiently, and it can be fast determined which key has been pushed.

In the second embodiment, the output terminals of the buffer circuits 17a to 17d are connected to the CPU 27. The CPU 27 determines which key matrix has been operated, from the signals output from the buffer circuits 17a to 17d. The CPU 27 generates a selection signal SS that corresponds to the key matrix found to have been operated. The selection signal SS is supplied to the multiplexer 15a. The multiplexer 15aselects the key matrix in accordance with the selection signal SS. The multiplexer 15a can therefore supplies the voltage (an analog signal) generated by the key matrix to the A/D converter 15b. Hence, the voltage generated when the any key of this key matrix is pushed can be converted to digital data, prior to the voltage generated in any other key matrices.

In the second embodiment described above, the outputs of the buffer circuits 17a to 17d are supplied to the CPU 27, and the CPU 27 determines which key matrix has been operated, from the output terminals of the buffer circuits 17a to 17d. Moreover, the voltage generated by the key matrix found to have been operated is converted to digital data, prior to the voltages generated by any other key matrices. Hence, it can be fast determined which key has been pushed. The CPU 27 can therefore control the television receiver within a short time after the operating mode of the microcomputer section is changed from the idle mode to the normal mode.

Third Embodiment

Figure 4:
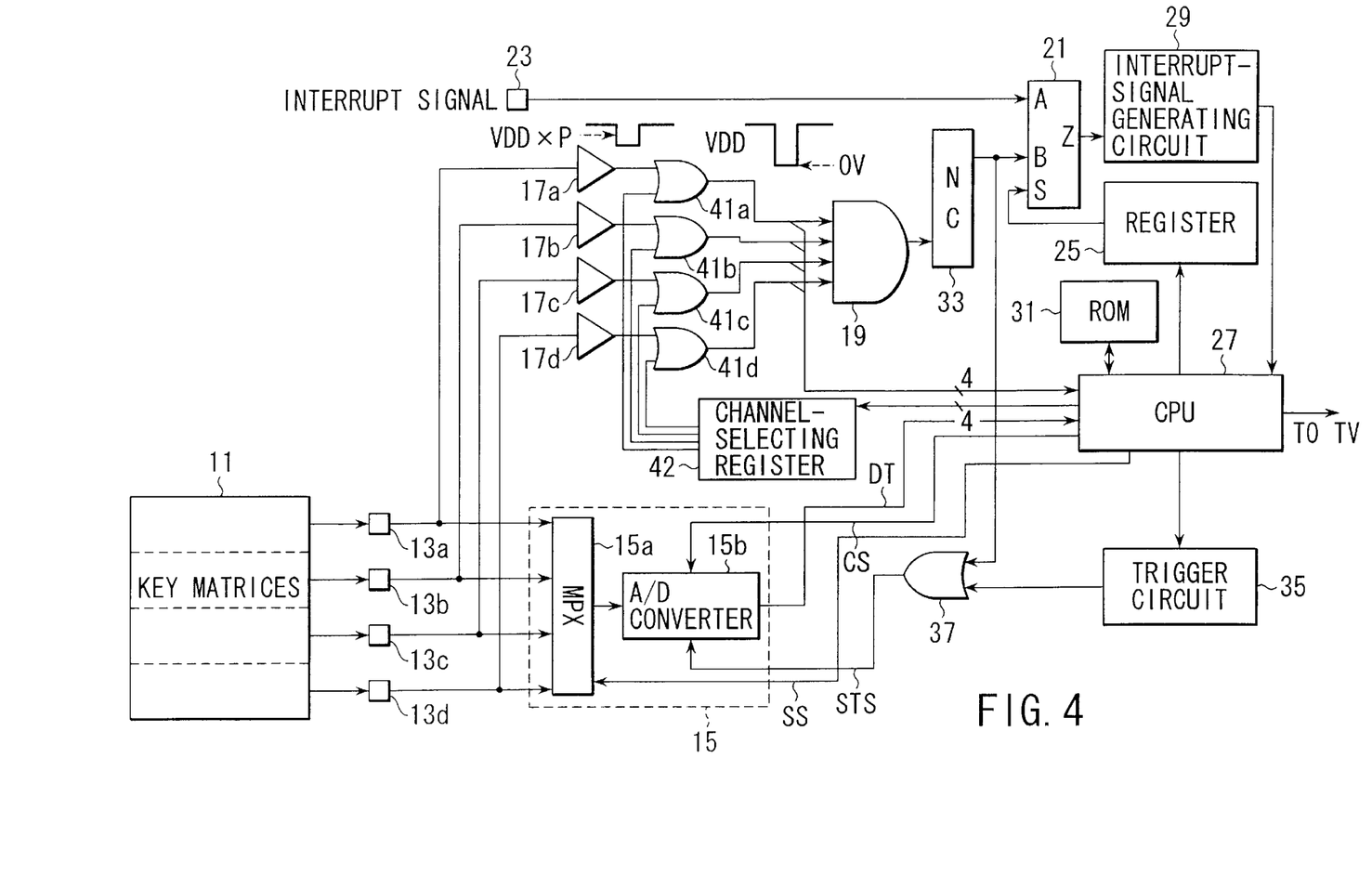
FIG. 4 is a diagram showing the microcomputer section of a television receiver, which incorporates the third embodiment of this invention.

FIG. 4 illustrates the microcomputer section of a television receiver, which incorporates the third embodiment of the present invention. The components identical to those of the first and second embodiments are designated at the same reference numerals. The third embodiment is characterized in that the A/D converter 15b starts operating within a shorter time than in the first and second embodiments, after the operating mode is changed from the idle mode to the normal mode.

In the first and second embodiments, the CPU 27 makes the A/D converter 15b start operating, when the operating mode is switched from the idle mode to the normal mode. By contrast, in the third embodiment, the CPU 27 is not used to make the A/D converter 15b start operating. Further, in the third embodiment, the operating mode is changed from the idle mode to the normal mode when the designated one of the key matrices 11 is operated.

As shown in FIG. 4, four two-input OR circuits 41a to 41d are provided between the buffer circuits 17a to 17b, on the one hand, and the AND circuit 19, on the other. The OR circuits 41a to 41d are connected at the first input terminal to the output terminals of the buffer circuits 17a to 17d, respectively, and at the output terminal to the AND circuit 19. The OR circuits 41a to 41d are connected at the second input terminal to the output terminal of a channel-selecting register 42. The output signal of the register 42 can therefore be supplied to the OR circuits 41a to 41d. The input terminal of the channel-selecting register 42 is connected to the CPU 27. The CPU 27 supplies data to the register 42 before the operating mode is chanted from the idle mode to the normal mode. The data supplied to the register 42 represents the channel that is to be selected.

A noise-canceling (NC) circuit 33 is provided between, and connected to, the AND circuit 19 and the input terminal B of the selector 21. The noise-canceling circuit 33 is a digital integrating circuit of the known type. The circuit 33 prevents the microcomputer section from making errors when the output signal of the AND circuit 19 momentarily falls to the low level due to noise. The output signal of the noise-canceling circuit 33 is supplied to the first input terminal of a two-input OR circuit 37. The second input terminal of the OR circuit 37 receives an output signal of a trigger circuit 35. The output terminal of the OR circuit 37 is connected to the A/D converter 15b. The trigger circuit 35 is, for example, a register and connected to the CPU 27. The CPU 27 supplies a signal of logic value "0" to the trigger circuit 36 before the operating mode is switched from the idle mode to the normal mode. The trigger circuit 36 holds this signal having the logic value "0".

How the third embodiment operates will be explained. The CPU 27 may supply a signal of logic value "0" to the register 25 immediately before the microcomputer section is set to the idle mode. The selector 21 selects the input terminal B in accordance with the signal output from the register 25. The control signal CS supplied from the CPU 27 turns off the A/D converter section 15.

The CPU 27 supplies a signal to the channel-selecting register 42, thereby to select the designated one of the key matrices 11. The register 42 holds this signal. The channel-selecting register 42 supplies this signal to the OR circuits 41a to 41d. Assume that the key matrix 11 connected to the buffer circuit 17a has been designated. Then, the CPU 27 supplies a signal to the channel-selecting register 42 in order to select the key matrix 11 connected to the buffer circuit 17a. In response to this signal, the channel-selecting register 42 supplies a signal of logic value "0" to the OR circuit 41a, whereas signals of logic value "1" are supplied to the other OR circuits 41b, 41c and 41d.

The CPU 27 supplies a signal of logic value "0" to the trigger circuit 35. The trigger circuit 35 holds this signal. The signal of logic value "0", held in the trigger circuit 35, is supplied to the OR circuit 37. Thereafter, the CPU 27 is deactivated.

When any one of the keys of the key matrices 11, which corresponds to the designated channel (i.e., buffer circuit 17a), is pushed in this condition, the key matrix 11 including the key pushed generates a voltage. The voltage is applied via the input terminal 13a to the A/D converter section 15 and the buffer circuit 17a. If the voltage is lower than the threshold voltage (VDD×p), the buffer circuit 17a generates a signal of logic value "0", which is supplied to the AND circuit 19 through the OR circuit 41a. The AND circuit 19 therefore generates a signal that has logic value "0". The output signal of the AND circuit 19 is supplied via the noise-canceling circuit 33 and selector 21 to the interrupt-signal generating circuit 29. The circuit 29 supplies an interrupt signal Int1 to the CPU 27 as in the first and second embodiments.

Meanwhile, the output signal of the noise-canceling circuit 33 is supplied to the OR circuit 37, along with the output signal of the trigger circuit 35. The output signal of the OR circuit 37 is therefore inverted. The A/D converter 15b therefore starts operating. The CPU 27 starts operating upon receipt of the interrupt signal Int1 and generates a selection signal SS. The selection signal SS is supplied to the multiplexer 15a, which selects the input terminal 13a. The voltage output from the key matrix connected to the input terminal 13a can, therefore, be supplied via the multiplexer 15a to the A/D converter 15b.

In the third embodiment described above, the A/D converter 15b starts operating in accordance with the signal output from the trigger circuit 35 and supplied to the OR circuit 37 and the signal output from the noise-canceling circuit 33. Therefore, the A/D converter 15b can be activated immediately after the operating mode of the microcomputer section is switched from the idle mode to the normal mode.

One of the buffer circuits 17a to 17d is designated in accordance with the output signal of the channel-selecting register 42. The output signal of the buffer circuit thus designated is detected, and the multiplexer 15a selects one of the input terminals 13a to 13d. Thus, one of the voltages generated by the key matrices 11 can be fast selected. This shortens the time between the key operation and the A/D conversion of the voltage selected.

Fourth Embodiment

Figure 5:
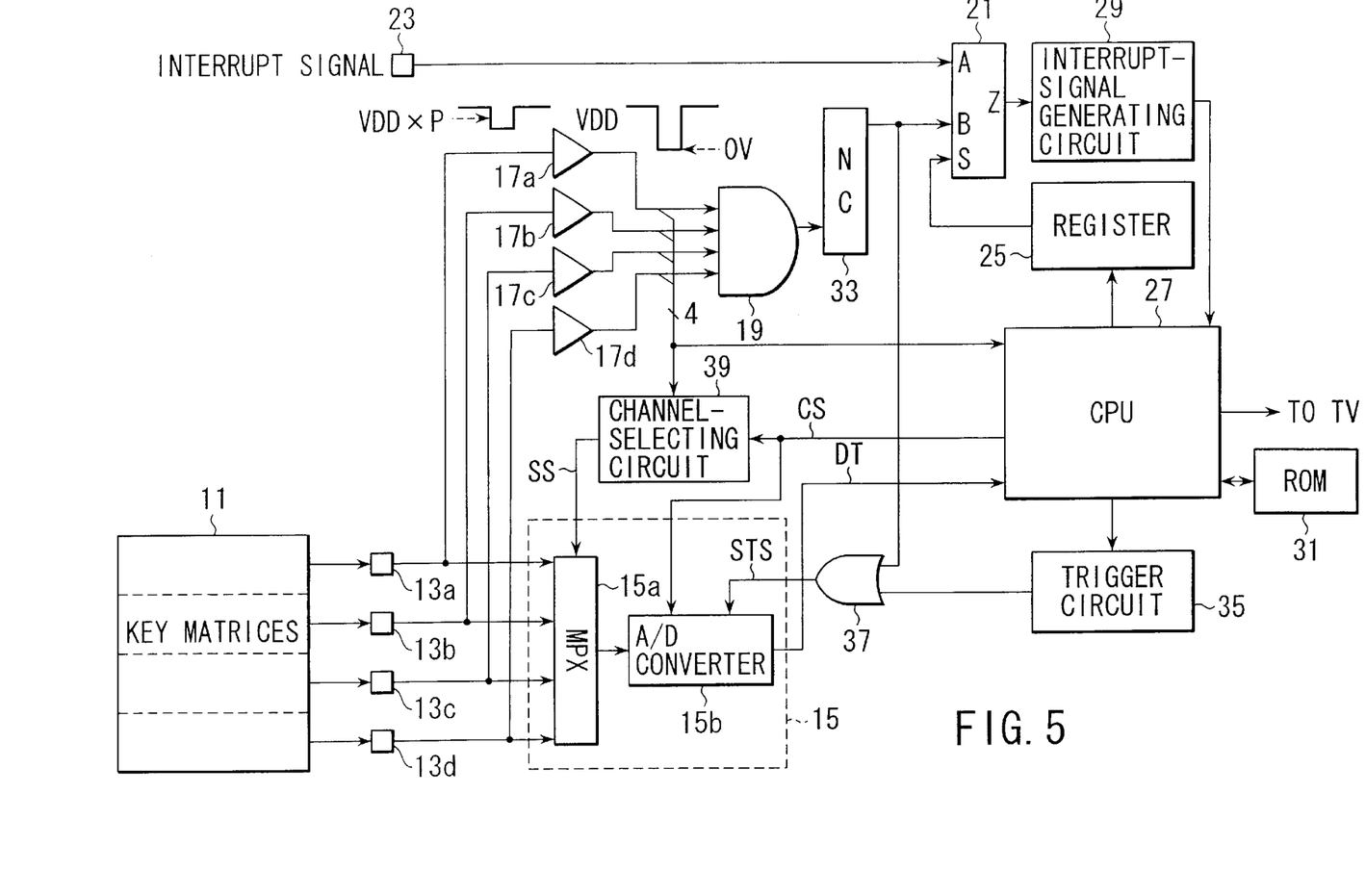
FIG. 5 is a diagram showing the microcomputer section of a television receiver, which incorporates the fourth embodiment of the invention.

FIG. 5 shows the microcomputer section of a television receiver, which incorporates the fourth embodiment of the invention. The fourth embodiment is a modification of the third embodiment. The components identical to those of the third embodiments are designated at the same reference numerals as those used in FIG. 4. The fourth embodiment is designed so that the multiplexer 15a may select one of the input terminals 13a to 13d more quickly, thereby to shorten the time between the key operation and the A/D conversion of the voltage selected.

As shown in FIG. 5, the output signals of the buffer circuits 17a to 17d are supplied to the CPU 27 and also to a channel-selecting circuit 39. The channel-selecting circuit 39 is, for example, a decoder. The circuit 39 determines which key matrix 11 has been operated, from the output signals of the buffer circuits 17a to 17d, and generates a selection signal SS. The selection signal SS is supplied to the multiplexer 15a.

How the fourth embodiment operates will be explained. The fourth embodiment operates in the same way as the third embodiment, until the microcomputer section is set to the idle mode.

If any key of one of the key matrices 11 is pushed in the idle mode, one of the output signals of the buffer circuits 17a to 17d comes to have logic value "0". The CPU 27, which has been in the idle mode, is set to the normal mode. The A/D converter 15b is thereby activated.

The channel-selecting circuit 39 detects the channel in which the output signal of the buffer circuit has acquired logic value "0". The circuit 39 generates a selection signal SS, which is supplied to the multiplexer 15a. The multiplexer 15a selects the input terminal 13a connected to the key matrix that has been operated. The voltage generated by this key matrix is thereby applied via the multiplexer 15a to the A/D converter 15b.

In the fourth embodiment, the channel-selecting circuit 39 detects changes in the output signals of the buffer circuits 17a to 17d. The multiplexer 15a is controlled by the changes in the output signals of the buffer circuits 17a to 17d, thus detected. The voltage generated by the key matrix operated can be fast applied to the A/D converter 15b. Note that the A/D converter 15b is not controlled by the CPU 27 at all. This shortens the time between the key operation and the A/D conversion of the voltage selected, though the microcomputer section has a plurality of key matrices 11.

The first to fourth embodiments are designed for use in television receivers. Nonetheless, the present invention can be applied to various electronic apparatuses other than television receivers.

The embodiments described above have four key matrices 11. According to the present invention, however, the number of key matrices used is not limited to four.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An interruption control circuit comprising:
a group of key matrices, each having keys and designed to generate different voltages when the keys are operated;
an analog-to-digital converter section for converting the voltages applied from the key matrices to digital data;
a control section designed to activate the analog-to-digital converter section in a normal mode, deactivate the same in an idle mode, stop operating in the idle mode, and determine, in the normal mode, which key of any key matrix has been pushed, from the digital data supplied from the analog-to-digital converter section;
a plurality of buffer circuits for receiving the voltages applied from the key matrices, respectively, each buffer circuit having a threshold voltage and designed to output a first-level signal when the voltage is equal to or higher than the threshold voltage and to output a second-level signal when the voltage is lower than the threshold voltage;
a logic circuit for receiving signals output from the buffer circuits and generating a detection signal when the signal output from any one of the buffer circuits changes; and
an interrupt-signal generating circuit connected to the logic circuit, for generating a signal for releasing the idle mode and supplying the same to the control circuit when the logic circuit generates the detection signal.

2. The circuit according to claim 1, wherein the analog-to-digital converter section comprises:
a multiplexer having an output terminal and input terminals for receiving the voltages from the key matrices, and designed to select one of the voltages in accordance with a selection signal supplied from the control section; and
an analog-to-digital converter connected to the output terminal of the multiplexer, for converting the voltage applied from the multiplexer, to digital data.

3. The circuit according to claim 2, wherein the multiplexer selects the voltages applied from the control section, one after another, in accordance with the selection signal supplied from the control section.

4. The circuit according to claim 1, further comprising:
a register for holding the signal supplied from the control section, in the idle mode; and
a selector having a first input terminal for receiving an interrupt signal, a second input terminal for receiving an output signal of the logic circuit and an output terminal connected to the interrupt-signal generating circuit, and designed to select the first input terminal or the second input terminal in accordance with a signal output from the register.

5. An interruption control circuit comprising:
a group of key matrices, each having keys and designed to generate different voltages when the keys are operated;
an analog-to-digital converter section for converting the voltages applied from the key matrices to digital data;
a control section designed to activate the analog-to-digital converter section in a normal mode, deactivate the same in an idle mode, stop operating in the idle mode, and determine, in the normal mode, which key of any key matrix has been pushed, from the digital data supplied from the analog-to-digital converter section;
a plurality of buffer circuits for receiving the voltages applied from the key matrices, respectively, each buffer circuit having a threshold voltage and designed to output a first-level signal when the voltage is equal to or higher than the threshold voltage and to output a second-level signal when the voltage is lower than the threshold voltage;
a logic circuit for receiving signals output from the buffer circuits and generating a detection signal when the signal output from any one of the buffer circuits changes;
an interrupt-signal generating circuit connected to the logic circuit, for generating a signal for releasing the idle mode and supplying the same to the control section when the logic circuit generates the detection signal; and
a signal-supplying circuit for supplying the output signals of the buffer circuits to the control section,
wherein the control section selects any key matrix in which at least one key has been pushed, in accordance with the output signals of the buffer circuits, and supplies a selection signal to the analog-to-digital converter section, and the analog-to-digital converter section converts the output voltage of the key matrix to digital data.

6. The circuit according to claim 5, wherein the analog-to-digital converter section comprises:
a multiplexer having an output terminal and input terminals for receiving the voltages from the key matrices, and designed to select one of the voltages in accordance with a selection signal supplied from the control section; and
an analog-to-digital converter connected to the output terminal of the multiplexer, for converting the voltage applied from the multiplexer, to digital data.

7. The circuit according to claim 5, further comprising:
a register for holding the signal supplied from the control section, in the idle mode; and
a selector having a first input terminal for receiving an interrupt signal, a second input terminal for receiving an output signal of the logic circuit and an output terminal connected to the interrupt-signal generating circuit, and designed to select the first input terminal or the second input terminal in accordance with a signal output from the register.

8. An interruption control circuit comprising:
a group of key matrices, each having keys and designed to generate different voltages when the keys are operated;
an analog-to-digital converter section for converting the voltages applied from the key matrices to digital data;
a control section designed to deactivate the same in an idle mode, stop operating in the idle mode, and determine, in a normal mode, which key of any key matrix has been pushed, from the digital data supplied from the analog-to-digital converter section;
a plurality of buffer circuits for receiving the voltages applied from the key matrices, respectively, each buffer circuit having a threshold voltage and designed to output a first-level signal when the voltage is equal to or higher than the threshold voltage and to output a second-level signal when the voltage is lower than the threshold voltage;

selection circuits connected to output terminals of the buffer circuits, respectively, each for selecting the output signal of the associated buffer circuit in the idle mode;

a logic circuit for receiving signals output from the selection circuits and generating a detection signal when the signal output from any one of the buffer circuits changes;

an interrupt-signal generating circuit connected to the logic circuit, for generating a signal for releasing the idle mode and supplying the same to the control section when the logic circuit generates the detection signal; and an activating circuit for activating the analog-to-digital converter section in accordance with the detection signal generated by the logic circuit.

9. The circuit according to claim 8, wherein the activating circuit comprises:

a holding circuit for holding a trigger signal supplied from the control section; and an auxiliary logic circuit connected to the holding circuit and the logic circuit, for activating the analog-to-digital converter section in accordance with the trigger signal and the detecting signal supplied from the holding circuit and the logic circuit, respectively.

10. The circuit according to claim 8, which further comprises a signal-supplying circuit for supplying the output signals of the buffer circuits to the control section, and in which the control section selects any key matrix in which at least one key has been pushed, in accordance with the output signals of the buffer circuits, supplied through a signal-supplying circuit, supplies a selection signal to the analog-to-digital converter section, and the analog-to-digital converter section converts the output voltage of the key matrix to digital data.

11. The circuit according to claim 10, wherein the analog-to-digital converter section comprises:

a multiplexer having an output terminal and input terminals for receiving the voltages from the key matrices, and designed to select one of the voltages in accordance with a selection signal supplied from the control section; and an analog-to-digital converter connected to the output terminal of the multiplexer, for converting the voltage applied from the multiplexer, to digital data.

12. The circuit according to claim 8, further comprising:

a register for holding the signal supplied from the control section, in the idle mode; and a selector having a first input terminal for receiving an interrupt signal, a second input terminal for receiving an output signal of the logic circuit and an output terminal connected to the interrupt-signal generating circuit, and designed to select the first input terminal or the second input terminal in accordance with a signal output from the register.

13. An interruption control circuit comprising:

a group of key matrices, each having keys and designed to generate different voltages when the keys are operated;

an analog-to-digital converter section for converting the voltages applied from the key matrices to digital data;

a control section designed to deactivate the same in an idle mode, stop operating in the idle mode, and determine, in a normal mode, which key of any key matrix has been pushed, from the digital data supplied from the analog-to-digital converter section;

a plurality of buffer circuits for receiving the voltages applied from the key matrices, respectively, each buffer circuit having a threshold voltage and designed to output a first-level signal when the voltage is equal to or higher than the threshold voltage and to output a second-level signal when the voltage is lower than the threshold voltage;

a logic circuit for receiving signals output from the buffer circuits and generating a detection signal when the signal output from any one of the buffer circuits changes;

an interrupt-signal generating circuit connected to the logic circuit, for generating a signal for releasing the idle mode and supplying the same to the control section when the logic circuit generates the detection signal; and a channel-selecting circuit for receiving the output signals of the buffer circuits, selecting any key matrix in which at least one key has been pushed, and outputting a selection signal, wherein the analog-to-digital converter section converts, to digital data, the voltage applied from the key matrices in accordance with the selection signal.

14. The circuit according to claim 13, further comprising an activating circuit for activating the analog-to-digital converter section in accordance with the detection signal generated by the logic circuit.

15. The circuit according to claim 14, wherein the activating circuit comprises:

a holding circuit for holding a trigger signal supplied from the control section; and an auxiliary logic circuit connected to the holding circuit and the logic circuit, for activating the analog-to-digital converter section in accordance with the trigger signal and the detecting signal supplied from the holding circuit and the logic circuit, respectively.

16. The circuit according to claim 13, which further comprises a signal-supplying circuit for supplying the output signals of the buffer circuits to the control section, and in which the control section selects any key matrix in which at least one key has been pushed, in accordance with the output signals of the buffer circuits, supplied through a signal-supplying circuit, supplies a selection signal to the analog-to-digital converter section, and the analog-to-digital converter section converts the output voltage of the key matrix to digital data.

17. The circuit according to claim 16, wherein the analog-to-digital converter section comprises:

a multiplexer having an output terminal and input terminals for receiving the voltages from the key matrices, and designed to select one of the voltages in accordance with a selection signal supplied from the control section; and an analog-to-digital converter connected to the output terminal of the multiplexer, for converting the voltage applied from the multiplexer, to digital data.

18. The circuit according to claim 13, further comprising:

a register for holding the signal supplied from the control section, in the idle mode; and a selector having a first input terminal for receiving an interrupt signal, a second input terminal for receiving an output signal of the logic circuit and an output terminal connected to the interrupt-signal generating circuit, and designed to select the first input terminal or the second input terminal in accordance with a signal output from the register.

* * * * *